US012775480B2

(12) United States Patent
Sidis et al.

(10) Patent No.: US 12,775,480 B2
(45) Date of Patent: Oct. 27, 2026

(54) DYNAMIC APPLICATION FRAMEWORK MOCKING IN STATIC ANALYSIS

(71) Applicant: CrowdStrike, Inc., Sunnyvale, CA (US)

(72) Inventors: Amir Sidis, Tel Aviv (IL); Saar Mano, Givatayim (IL); Eyal Mamo, Tel Aviv (IL)

(73) Assignee: CrowdStrike, Inc., Sunnyvale, CA (US)

( * ) Notice: Subject to any disclaimer, the term of this patent is extended or adjusted under 35 U.S.C. 154(b) by 1145 days.

(21) Appl. No.: 17/804,063

(22) Filed: May 25, 2022

(65) Prior Publication Data

US 2023/0385089 A1 Nov. 30, 2023

(51) Int. Cl.
*G06F 9/455* (2018.01)
*G06F 8/75* (2018.01)

(52) U.S. Cl.
CPC ............ *G06F 9/45508* (2013.01); *G06F 8/75* (2013.01)

(58) Field of Classification Search
None
See application file for complete search history.

(56) References Cited

U.S. PATENT DOCUMENTS

| | | | | |
|---|---|---|---|---|
| 6,314,558 | B1 * | 11/2001 | Angel | G06F 9/44 717/4 |
| 7,549,144 | B2 | 6/2009 | Jubran | |
| 9,110,737 | B1 | 8/2015 | Tibble et al. | |
| 9,645,804 | B2 | 5/2017 | Tibble et al. | |
| 9,672,355 | B2 | 6/2017 | Titonis et al. | |
| 9,678,747 | B2 * | 6/2017 | Beckett | G06F 9/45 |
| 10,133,870 | B2 | 11/2018 | Tripp | |
| 10,216,608 | B1 | 2/2019 | Arguelles | |
| 10,353,678 | B1 * | 7/2019 | Wagner | G06F 11/36 |
| 10,482,262 | B2 | 11/2019 | Sharma et al. | |
| 2009/0293049 | A1 | 11/2009 | Gorelkina | |
| 2011/0078507 | A1 | 3/2011 | Choi et al. | |
| 2017/0046399 | A1 | 2/2017 | Sankaranarasimhan et al. | |

* cited by examiner

*Primary Examiner* — Rehana Perveen
*Assistant Examiner* — Kyle H Tseng
(74) *Attorney, Agent, or Firm* — Womble Bond Dickinson (US) LLP

(57) ABSTRACT

A system and method for emulating application code in a simulated environment. The method includes receiving an application code including an external initialization code component, the application code deployed in a cloud computing environment; detecting a connection request in the external initialization code component; emulating a response to the connection request; and storing the emulated response for generating a set of instructions for a static analyzer to perform static analysis on the application and the generated set of instructions.

11 Claims, 6 Drawing Sheets

DYNAMIC APPLICATION FRAMEWORK MOCKING IN STATIC ANALYSIS

TECHNICAL FIELD

The present disclosure relates generally to techniques for performing static analysis, and specifically to techniques for performing static analysis on applications deployed using a backend framework.

BACKGROUND

Application frameworks are a popular field of computer software development, which provides a standardization in structure of software development. Application frameworks became popular in response to computer interfaces transitioning to graphical user interfaces (GUIs). For example, applications developed for Microsoft® Windows operating system may use libraries which allow utilization of network protocols, memory, and the like resources, in a manner which is optimized for the operating system. One such software framework is the .NET framework.

Similarly, web frameworks are software frameworks which support standardization of web applications, such as Jakarta® Enterprise Edition, Microsoft® ASP.NET, VMware® Spring®, Google® Guice, and the like. Certain frameworks operate on a principal which is known in the art as Inversion of Control (IoC). While in traditional software a custom code calls in reusable libraries from a framework, an IoC framework calls into the custom code.

Dependency injection is a technique utilized by IoC frameworks. This refers to supplying a client software object other objects (called service objects) that the client software object depends on. The client therefore does not generate or lookup the service, but rather is provided it. This allows to use a thinner client, which does not need the information of how to build a service, since it is injected the service as needed. Spring® Boot for example allows building standalone applications which integrate proprietary libraries and third party libraries, which means a user may author custom code which is deployed into a cloud computing environment (such as Google® Cloud Platform (GCP)), and upon run time, the application is loaded through the Spring® Framework which performs all the required connections, injections, and the like, required by the custom code. For example, a custom code may indicate a connection to a database, and the IoC framework connects the object calling the database, to the database, at runtime.

Applications deployed using IoC frameworks pose a challenge for static analysis techniques. By definition, the code which utilizes an IoC framework is not complete in the sense that all parameters are contained within the code. This code incompleteness is prevalent in other code deployments as well, where as part of the code initialization process calls are made to external resources such as databases, libraries, configuration files, environment variables, and the like. There are potentially many calls and connections, for example, which are only available at runtime, and are therefore not exposed to static analysis techniques.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for emulating application code in a simulated environment. The method comprises: receiving an application code including an external initialization code component, the application code deployed in a cloud computing environment; detecting a connection request in the external initialization code component; emulating a response to the connection request; and storing the emulated response for generating a set of instructions for a static analyzer to perform static analysis on the application and the generated set of instructions.

Certain embodiments disclosed herein also include a non-transitory computer readable medium having stored thereon causing a processing circuitry to execute a process, the process comprising: receiving an application code including an external initialization code component, the application code deployed in a cloud computing environment; detecting a connection request in the external initialization code component; emulating a response to the connection request; and storing the emulated response for generating a set of instructions for a static analyzer to perform static analysis on the application and the generated set of instructions.

Certain embodiments disclosed herein also include a system for emulating application code in a simulated environment. The system comprises: a processing circuitry; and a memory, the memory containing instructions that, when executed by the processing circuitry, configure the system to: receive an application code including an external initialization code component, the application code deployed in a cloud computing environment; detecting a connection request in the external initialization code component; emulate a response to the connection request; and store the emulated response for generating a set of instructions for a static analyzer to perform static analysis on the application and the generated set of instructions.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
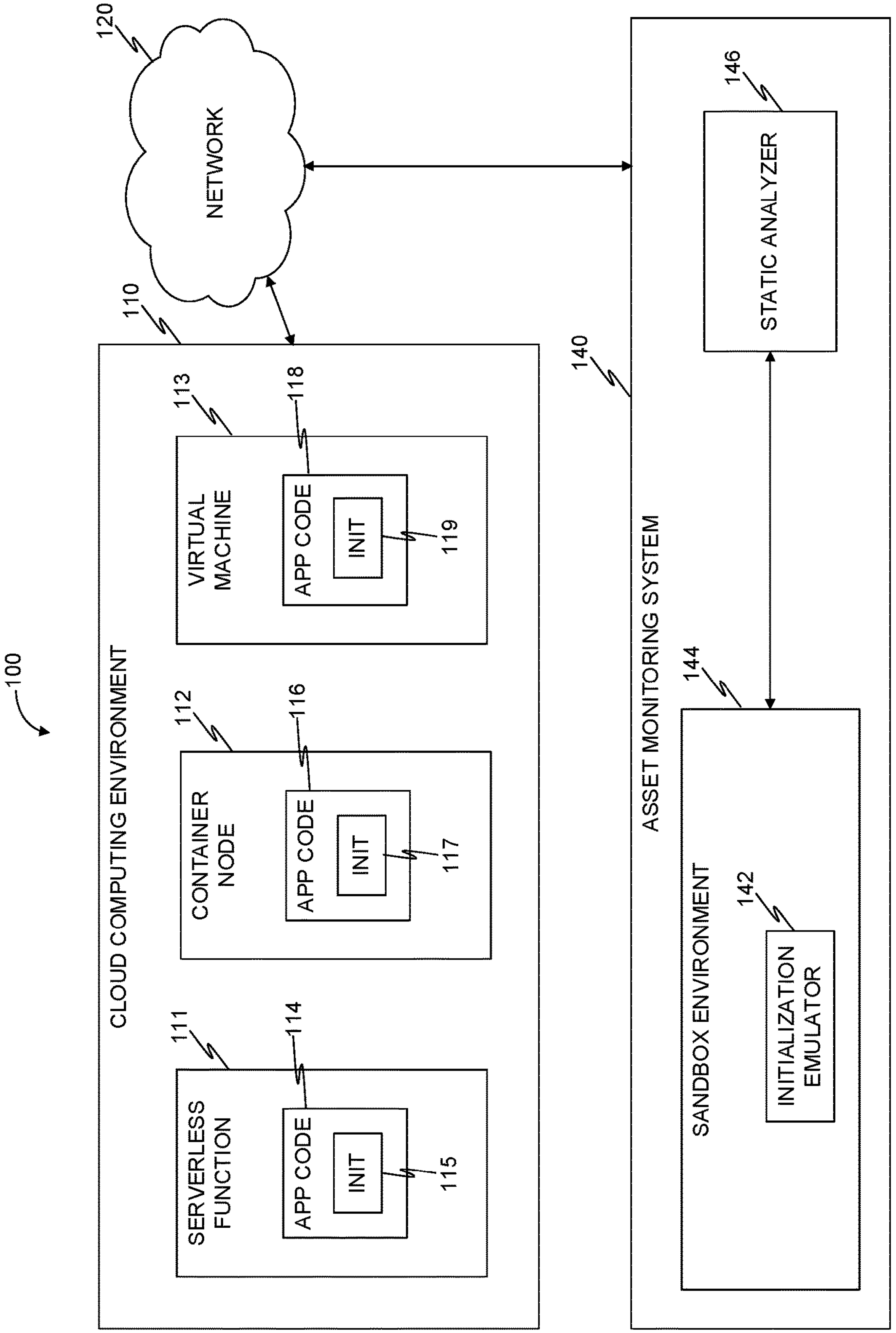
FIG. 1 is a schematic illustration of an asset monitoring environment implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for performing static analysis on an application having an external initialization, by emulating execution of an application code in a simulated environment. An external initialization engine may be, for example, an inversion of control (IoC) engine. The external initialization engine is allows application code to perform various calls and connections to other resources, without specifically declaring such in the application code. As such, static analysis techniques fail to analyze such application code since various calls, functions, and the like, cannot be traced due to the external initialization which does not occur in the application code. The technique disclosed provides a method for emulating application code execution using a simulated environment. Calls, connections requests, and the like are realized in an external initialization portion of the application code, and responses to such calls and connection requests are emulated in order to record execution of the application code. Machine code, such as bytecode, is generated based on these recorded actions, and together with the application code is provided to a static analyzer. Static analysis is possible using the results of the simulated external initialization and the application code together, as traceability can be achieved.

FIG. 1 is an example of a schematic illustration of an asset monitoring environment 100 implemented in accordance with an embodiment. A computing environment 110 includes a plurality of workloads. In an embodiment the computing environment may be a cloud computing environment. The computing environment 110 may be implemented, for example, as a virtual private cloud (VPC) over a cloud computing infrastructure. Cloud computing infrastructure may be, for example, Amazon® Web Services (AWS), Google® Cloud Platform (GCP), Microsoft® Azure, Oracle® Cloud Infrastructure (OCI), and the like. In certain embodiments, the cloud computing environment 110 may include a plurality of VPCs, each implemented on a cloud computing infrastructure. While this example discusses a cloud computing environment, the teachings herein may equally apply to other computing environments.

The cloud computing environment 110 includes a plurality of workloads. A workload may be a serverless function, such as serverless function 111, a container engine running container nodes, such as container node 112, and a hypervisor running a virtual machine (VM), such as VM 113. A serverless function may be deployed utilizing Amazon® Lambda. A container node may be deployed on a container engine such as Docker®, Kubemetes®, and the like. A VM may deployed on a hypervisor such as Oracle® VirtualBox®. In certain embodiments the cloud computing environment 110 may further include a code repository (not shown). A code repository is a system for managing code versions, also known as version control software, written by multiple collaborators (users). A version control software may be, for example, Git™, AWS CodeCommit™, and the like.

Certain workloads in the cloud computing environment 110 include computer code, which when executed by a processing circuitry perform a predetermined action in the cloud computing environment 110. For example, the VM 113 includes an application code 118. In an embodiment, application code 118 may be implemented utilizing, for example Java™, JavaScript™, and the like. Application code, may be, for example, source code, object code, bytecode, and the like.

When executed, for example by a processing circuitry, application code begins a process of initialization. In an embodiment, initialization is performed by executing initialization code (init), such as init 119, which is the initialization code of application code 118. Initialization may include, for example, assigning an initial value to a data object, assigning an initial value to a variable, calling a library, and the like. In certain embodiments, a library includes any of one of: configuration data, preprogrammed code, a subroutine, a class, a system call, and the like. In some embodiments, the init 119 includes dependency injection code, for example as used by an inversion of control (IoC) framework.

The cloud computing environment 110 is connected to a network 120. The network 120 may be, but is not limited to, a wireless, cellular or wired network, a local area network (LAN), a wide area network (WAN), a metro area network (MAN), the Internet, the worldwide web (WWW), similar networks, and any combination thereof. In an embodiment, the network 120 provides connectivity between an asset monitoring system (AMS) 140 and the cloud computing environment 110. In certain embodiments, the AMS 140 may be deployed on a cloud computing infrastructure, for example the same cloud computing infrastructure of the cloud computing environment 110.

The AMS 140 is configured to receive data from compute environments, analyze the data, and discover applications and communications between such applications. In an embodiment the AMS 140 may cause a collector (also known as a collection application, not shown) to install for a predefined duration on a workload. The collector is configured to collect application data. Application data may be collected from multiple sources, utilized to execute, develop, or otherwise deploy in the compute environment. The collected data may include, but is not limited to, the binary code of each application, software libraries, error logs, script code, configuration files (environment variables, command line, etc.), credentials, and the like. Binary code, or any code, may be collected by collectors executed on a server hosting an application. For example the VM 113 may be a server hosting an application having application code 118. The data is collected per each application and may include binary code and configurations. The collection of such data can be triggered at predefined time intervals, or upon receiving an event from a software deployment tool (e.g., a CI/CD tool). In an embodiment, the duration of a collector's presence on a workload may be determined by a fixed amount of time, a predefined set of actions, and any combination thereof.

The AMS 140 includes a sandbox environment 144. A sandbox environment 144 is an isolated computing environment in which software code can be deployed, for example for testing purposes. A sandbox environment may be implemented, for example, as a virtual machine, a container node in a container, and the like. The sandbox environment 144 includes an initialization emulator 142 (also referred to as emulator 142), discussed in more detail below. In an embodiment the initialization emulator 142 is configured to receive application code, execute the application code, and emulate initialization conditions as required by an init section of the application code.

The AMS 140 further includes a static analyzer 146. In an embodiment the static analyzer 146 is configured to receive a set of instructions, and perform static analysis on the set of instructions. A set of instructions may be generated by the emulator 142. In certain embodiments the static analyzer 146 may receive the set of instructions, and other data collected from the computing environment 110, in order to perform static analysis of the set of instructions. For example, the static analyzer 146 may receive runtime data generated by an application, as well as a set of instructions generated based on the application's code.

Figure 2:
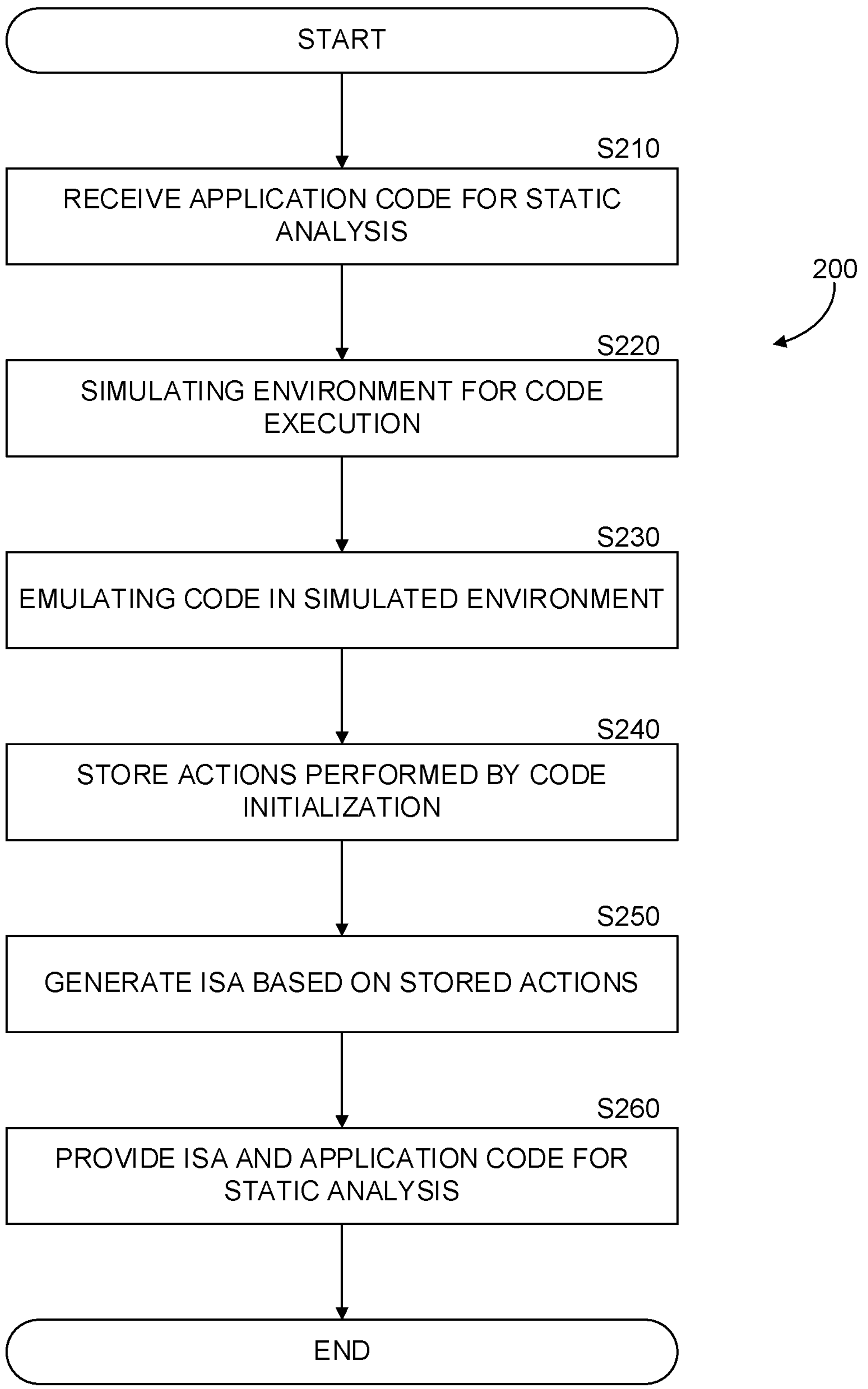
FIG. 2 is a flowchart of a method for performing static analysis on application code having external initialization.

FIG. 2 is an example flowchart 200 of a method for performing static analysis on application code having external initialization. In an embodiment, external initialization refers to an initialization (init) part of an application code, which when executed by a processing circuitry configure a system to request resources which are external to the application code. For example, auto configuration of applications, dependency management software, and the like, provide external initialization. For example, Spring® Boot is a framework which provides external initialization, for example by performing dependency injection.

This allows an application to be coded in a way where services which are required by the application do not need to be hard coded into the application code, but rather the framework (also called an injector) supplies these services. For example, the injector may connect to an existing service, or construct a service on-demand for the application. This is advantageous, for example, when coding microservice applications, as the time required to deploy an application is reduced, due to benefits provided by the injector. However, when performing static analysis of such code a problem arises as dependencies cannot be traced, due to dependencies not existing in the code until it is actually initialized.

At S210, application code is received. In an embodiment, application code may be received from a collector application installed on a workload. The collector application may be installed by an asset monitoring system (ASM), such as ASM 140 of FIG. 1 above. In an embodiment, application code includes machine code, bytecode, interpreted script language, and the like. The received application code is code which includes external initialization, for example, as explained above. The external initialization portion of the application code is also referred to throughout as the init.

At S220, an environment is simulated for code execution. In an embodiment, simulating an environment may include initializing a sandbox environment. For example, a sandbox environment may be a virtual workload, such as a virtual machine, a container node, and the like. The simulated environment is a computing environment. In certain embodiments, the simulated environment includes an operating system (OS), a library, a binary file, and the like. An OS may be, for example, Microsoft® Windows®, Linux®, and the like. A library may include configuration data, preprogrammed code, a subroutine, a class, a system call, and the like. A binary file may be a computer readable file, which is not a text file.

At S230, the received application code is emulated in the simulated environment. In an embodiment emulating the received application code in the simulated environment includes execution of the application code. The application code includes an init portion, for receiving services from an injector. In certain embodiments, S230 further includes emulating an injector. In an embodiment, emulating an injector includes generating a response to a call from the application code. For example, the 'init' may call a database (i.e., request a connection to a database).

The emulator may generate a response back to the application code to indicate that the database connection was successful. The response may include, for example, a name, a network address, and the like identifiers, for the database. Generating a response to such calls for external resources allows the application to initialize completely and enter a state where the application is operative. If an attempt is made to initialize the application without responses to such calls from the init, then the application will likely fail to initialize, which impedes the ability to perform static analysis on the application. In certain embodiments, emulating the received application code may further include monitoring and storing actions performed by the application when initializing. An example of a method for emulating application code in a simulated environment is discussed in more detail in FIG. 3 below.

At S240, a code initialization action is stored. In some embodiments, the emulator may record and store actions performed by code initialization. A code initialization action may be, for example, a response generated based on a request from the application code to connect to an external service. For example, a code initialization action may be to generate a response that connection to a database was successful, the database having a network address which is provided back to the application code. An example of a method for detecting and storing code initialization actions is discussed in more detail in FIG. 4 below.

At S250, a set of instructions is generated. In an embodiment, the set of instructions is generated according to the application code, the stored initialization action(s), and a combination thereof. In some embodiments, the set of instructions includes machine code, bytecode, or interpreted script language, and the like. For example, Java® bytecode can be generated according to the application code and at least one stored initialization action. In an embodiment, the generated set of instructions includes an instruction which describes the initialization portion of an application code.

At S260, the generated set of instructions and application code are provided to a static analyzer. In an embodiment, the static analyzer 146 of FIG. 1, is provided with the generated set of instructions and application code. In an embodiment, the static analyzer is configured to perform static analysis for application discovery. A method for performing application discovery utilizing static analysis is discussed in more detail in U.S. patent application Ser. No. 17/655,653, the entire contents of which are incorporated by reference herein. An example of a method for providing a generated set of instructions to a static analyzer is discussed in more detail in FIG. 5 below.

Figure 3:
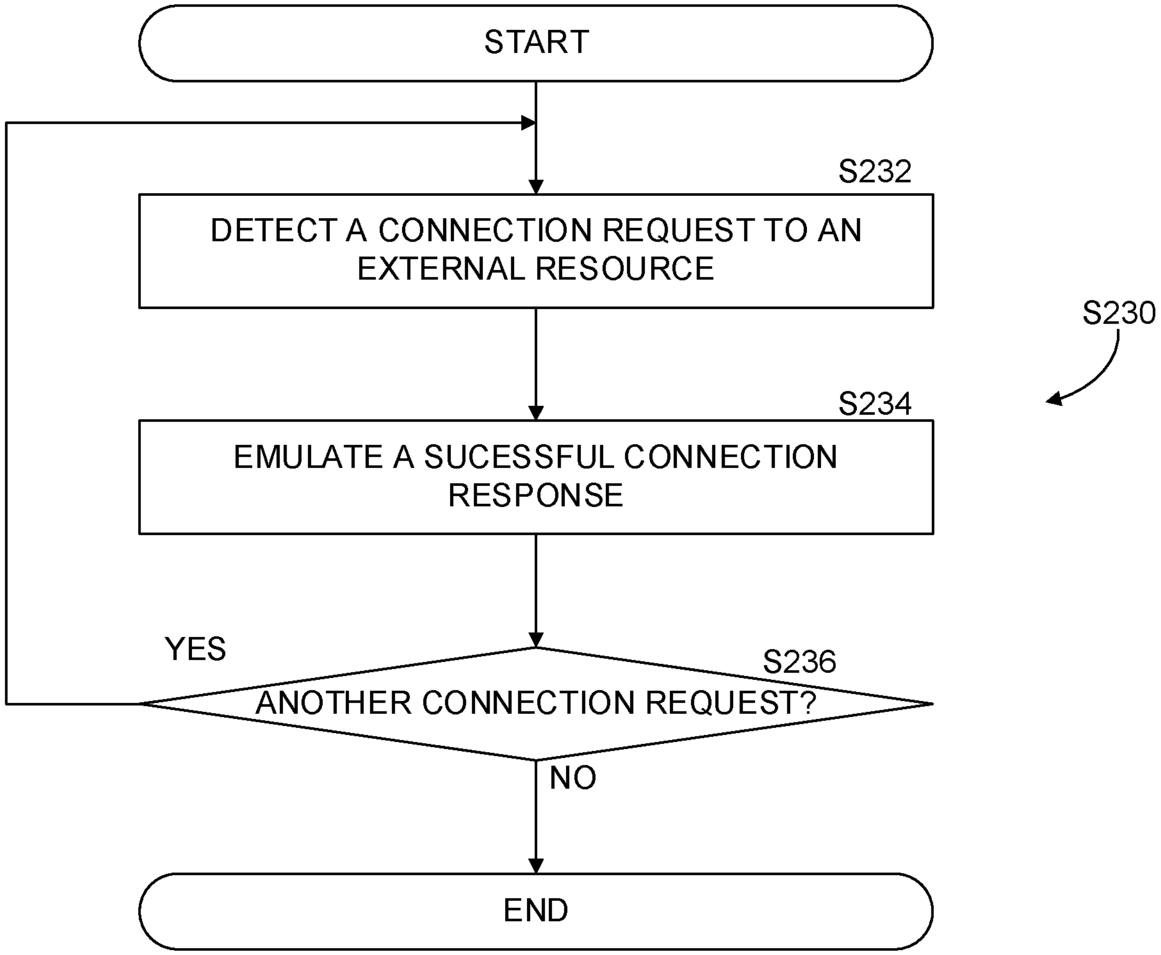
FIG. 3 is a flowchart of a method for emulating application code in a simulated environment, implemented according to an embodiment.

FIG. 3 is an example flowchart S230 of a method for emulating application code in a simulated environment, implemented according to an embodiment.

At S232, a connection request is detected. In an embodiment, the connection request is detected in an initialization portion of an application code. A connection request may include a call to an external resource. In some embodiments, the connection request includes a request to connect to an external resource. The external resource may be, for example, a database, a software library, a software class, a network service, a cloud based software service, and the like.

At S234, a connection response is emulated. In an embodiment, the connection response results in successful execution of the initialization code portion which includes therein the connection request. The connection response may be, for example: injecting an emulated value, injecting an emulated object, and the like. In some embodiments, a second emulated value (or emulated object, as the case may be) is injected in response to detecting that the application code was not initialized.

At S236, a check is performed to determine if another connection request requires a response. In an embodiment, the check includes detecting another connection request. In some embodiments, a plurality of connection requests are detected. In an embodiment, if additional connection requests exist for which a connection response has not been emulated execution continues at S232, otherwise execution terminates.

Figure 4:
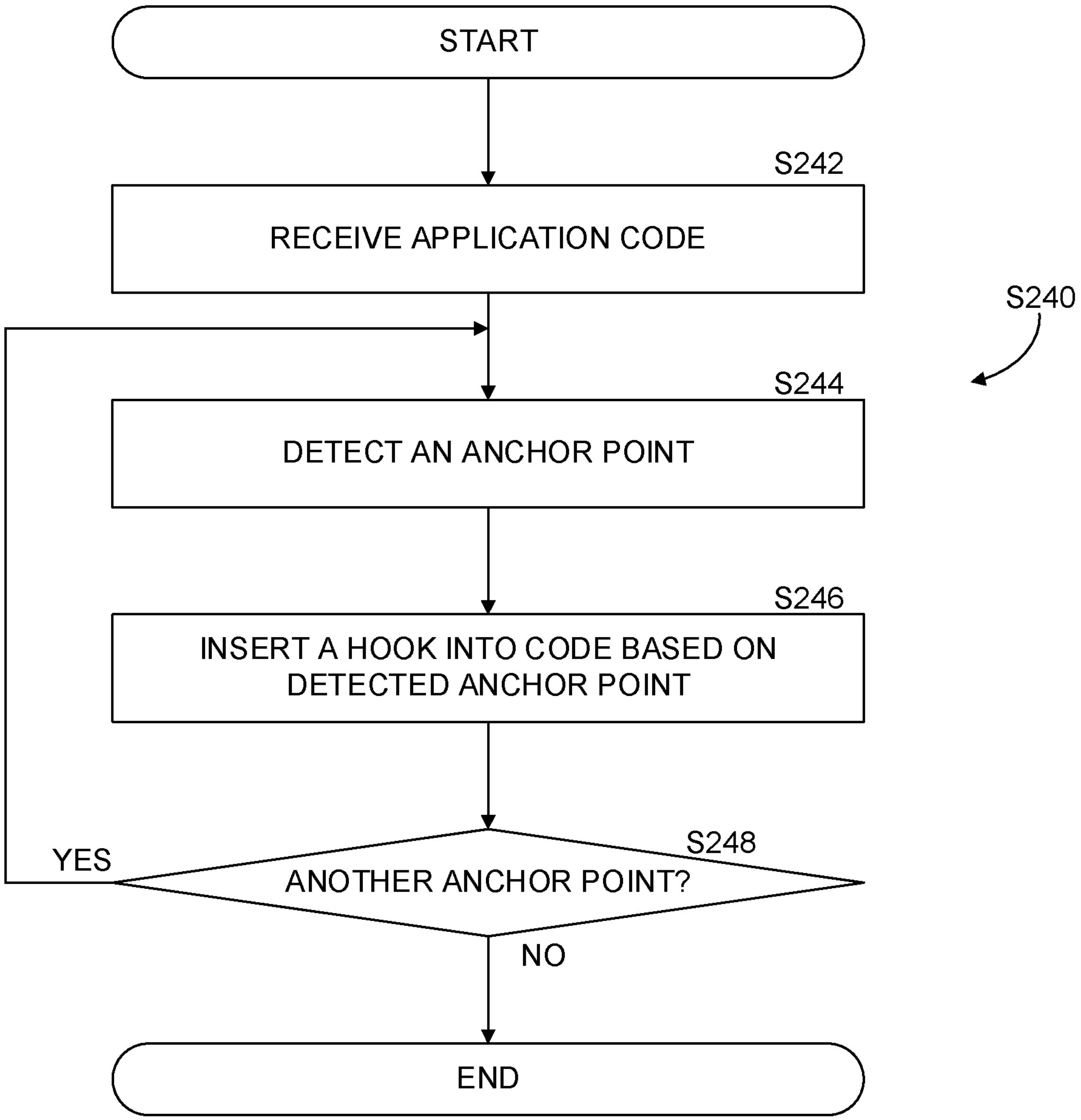
FIG. 4 is a flowchart of a method for detecting and storing code initialization actions, implemented in accordance with an embodiment.

FIG. 4 is an example flowchart S240 of a method for detecting and storing code initialization actions, implemented in accordance with an embodiment. In an embodiment, storing code initialization actions may also be referred to as recording initialization of an application. In certain embodiments, the method may be performed by an emulator of an asset monitoring system.

At S242, application code is received. The application code includes an initialization code portion. In an embodiment application code may be received from a collector application installed on a workload. The collector application may be installed by an asset monitoring system (ASM), such as ASM 140 of FIG. 1 above. In an embodiment, application code includes machine code, bytecode, or interpreted script language, and the like. The received application code is code which includes external initialization, for example, as explained above. The external initialization portion of the application code is also referred to throughout as the init.

At S244, an anchor point is detected. In certain embodiments, detecting an anchor point may be achieved by providing the application code to a static analyzer, such as the static analyzer 146 of FIG. 1, and receiving from the static analyzer the detected anchor point. In an embodiment detecting an anchor point includes detecting a plurality of objects and relationships in the application code. For example, a plurality of code objects may be detected in the application code. A data object may, for example, a function. A first function may call a second function, for example, a function from a library. Thus, the first function and the second function share a 'call' relationship, which in this example is directional (i.e., the first function calls the second function, but the second function does not call the first function).

In an embodiment, an anchor point includes an indicator of a function name (such as parentheses), tags (such as in hypertext markup language—HTML), and the like. Anchor points may be detected according to a set of heuristics, which are used to determine for example which code objects are of interest. For example, an anchor point may be a function that calls a database, a REST (REpresentational State Transfer) API (application programming interface) call, service request, and the like. These code objects are of interest as they indicate how an application communicates and with what other resources and principals it communicates with.

At S246, a hook is inserted into the application code. In an embodiment, the hook is inserted based on the detected anchor point. A hook is an instruction inserted into the application code in order to send information about a state relating to the application code to another software, such as the emulator. For example, the hook may cause the application to store a state of the application in a predetermined location. The emulator may record such information. In an embodiment, information received from the inserted hook includes any of: a value, a function name, a uniform resource locator (URL), a library, and the like.

At S248, a check is performed to determine if another anchor point is to be detected. If 'yes', execution continues at S244. Otherwise, execution may terminate. In an embodiment, a plurality of anchor points may be detected, and a list of anchor points is generated. In such embodiments, the check may be used to advance to the next anchor point, thereby detecting the next anchor point in the application code, inserting a hook based on the next anchor point, and so on.

Figure 5:
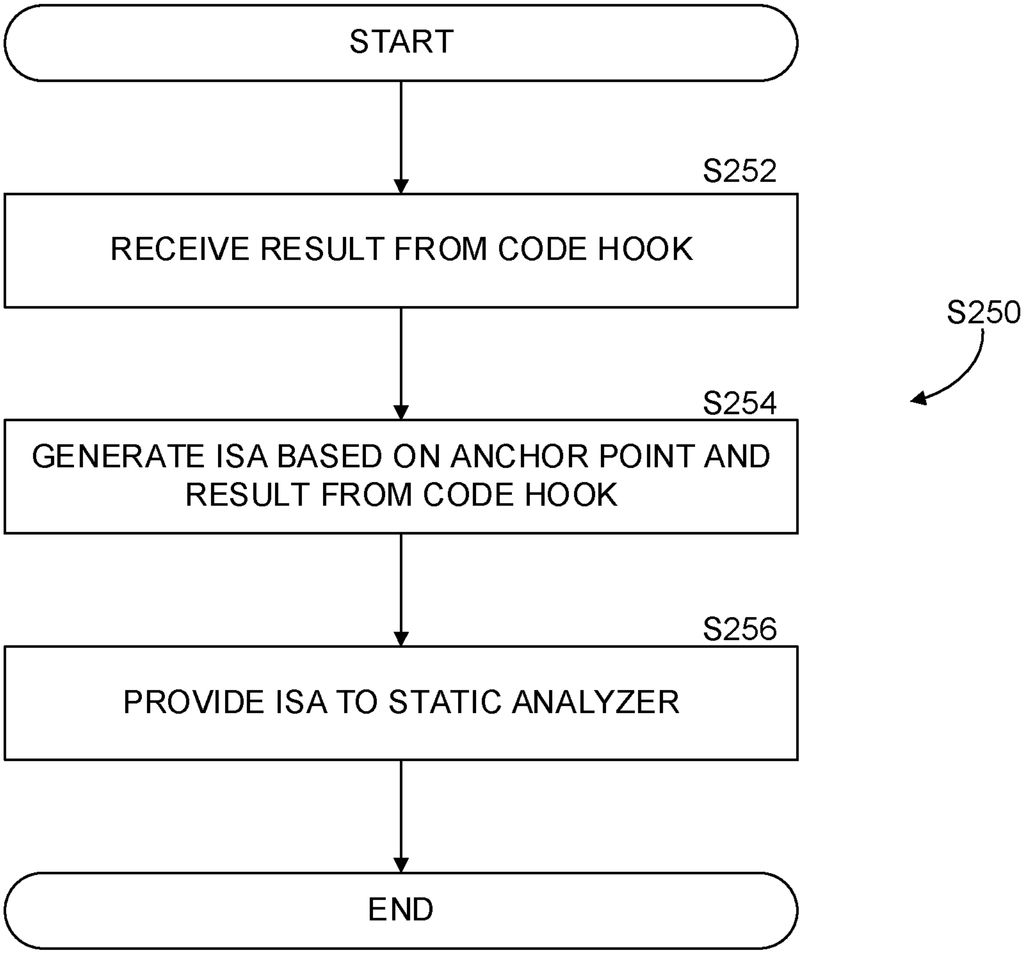
FIG. 5 is a flowchart of a method for providing a generated set of instructions to a static analyzer, implemented in accordance with an embodiment.

FIG. 5 is an example flowchart S250 of a method for providing a generated set of instructions to a static analyzer, implemented in accordance with an embodiment. In an embodiment, the static analyzer receives the generated set of instructions and application code, and performs static analysis on the set of instructions and application code. The application code, together with the generated set of instructions provide the static analyzer with a complete state machine for the application, meaning that all calls, for example, can be resolved. In an embodiment resolving code includes tracing code objects through the application code. In certain embodiments, resolving a call includes determining an exact value, function, and the like, the application is calling.

At S252, a result is received from a code hook. A method of inserting code hooks into the application code is discussed in more detail with regards to FIG. 4 above. In certain embodiments, the result may include any of: a value, a function name, a URL, a library, and the like. In some embodiments, results from the code hook may be stored in a memory or storage of the emulator, and read from there as part of the receiving step.

At S254, an set of instructions is generated. In an embodiment, the set of instructions includes at least a computer readable code, which is generated based on at least one received result, and corresponding anchor point. The corresponding anchor point is the anchor point based on which the code hook, from which the result was received, was inserted in the application code. In an embodiment, the set of instructions may be generated based on: the application code, a stored initialization action (i.e., result received from a code hook), and a combination thereof. In some embodiments, the set of instructions is: machine code, bytecode, interpreted script language, and the like. For example, Java® bytecode may be generated based on the application code and at least one stored initialization action.

At S256, the generated set of instructions is provided to a static analyzer. In an embodiment, the generated set of instructions may be stored in a memory or storage, from which a static analyzer, such as the static analyzer 146 of FIG. 1 above, is configured to read the stored set of instructions.

Figure 6:
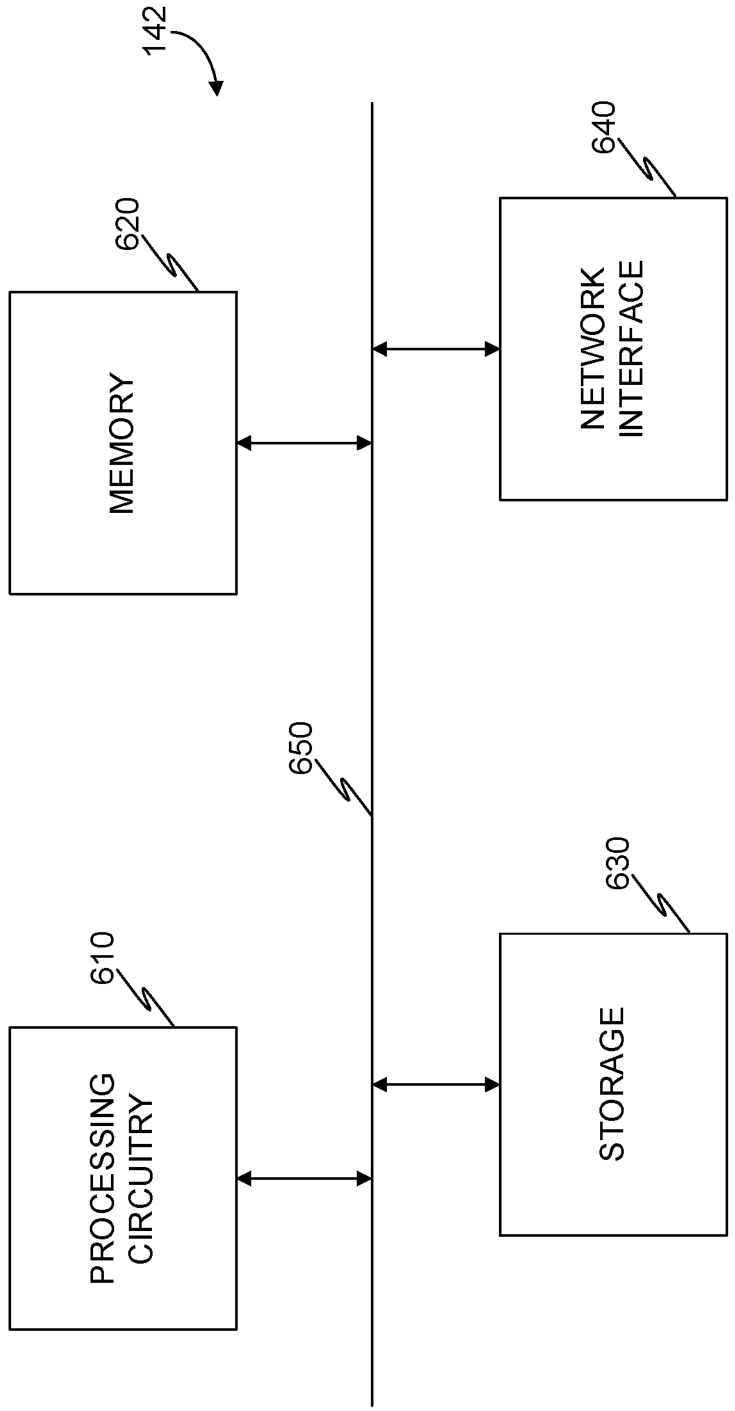
FIG. 6 is a schematic diagram of an initialization emulator, according to an embodiment.

FIG. 6 is an example schematic diagram of an initialization emulator (emulator) 142, according to an embodiment. The emulator 142 includes a processing circuitry 610 coupled to a memory 620, a storage 630, and a network interface 640. In an embodiment, the components of the emulator 142 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, or any other medium which can be used to store the desired information.

The network interface 640 allows the emulator 142 to communicate with, for example, the static analyzer 146 of FIG. 1, a collector from which application code is received, and the like.

It should be understood that the embodiments described herein are not limited to the specific architecture illustrated in FIG. 6, and other architectures may be equally used without departing from the scope of the disclosed embodiments. In some embodiments, the asset monitoring system 140, and the static analyzer 146 may be implemented using an architecture such as the one illustrated in FIG. 6, or other equal architectures.

An example application code may be:

```
// Main.java
public static class Main {
   public static void main( ) {
      Spring.init( );
   }
}
```

The application code includes a call to Spring® Boot, which is an external initialization framework. When executed, for example in a production cloud computing environment, the initialization framework scans all classes, and initializes code having an "@Component" annotation. Example classes may be:

```
// ConnectionManager.java
@Component
public class ConnectionManager {
```

-continued

```
   @Value("connectionmanager.url")
   private String url;
   public String getUrl( ) {
      return this.url;
   }
}
// DataQueryService.java
@Component
public class DataQueryService {
   @Autowire
   private ConnectionManager connectionManager;
   @PostConstruct
   public void run( ) {
      RestUtil.post(connectionManager.getUrl( ), "test-
data");
   }
}
```

When ConnectionManager is initialized, connectionmanager.url is injected with the value from an "application.properties" configuration file, according to the @Value annotation. The "application.properties" configuration file may be, for example:

//application.properties connectionmanager.url=https://google.com/api/vl

In an embodiment, the "application.properties" configuration file may be simulated, and generated with a predefined URL (or other, appropriate value). When DataQueryService is initialized, DataQueryService.connectionManager is injected with the previously generated object (i.e., ConnectionManager) which is maintained by the initialization framework.

Once the initialization framework has resolved all of the dependencies, the framework searches for @Postconstruct annotated methods in order to execute the application code. In this example, DataQueryService::run is executed.

The application code may be inserted with a code hook to record actions performed by the application and initialization framework when objects are initialized. This code may be, for example:

```
// ByteCodeEmulationOutput.java
public class EmulationResult {
   public static void bytecode( ) {
      ConnectionManager x = new ConnectionManager( );
      x.url = "https://google.com/api/v1";
      DataQueryService y = new DataQueryService( );
      y.connectionManager = x;
   }
}
```

The emulator may prevent DataQueryService::run from being executed. The code hook execution further results in bytecode being generated. EmulationResult::bytecode is generated, for example by the emulator. The bytecode is provided to a static analyzer when "RestUtil.post" (in DataQueryService::run) is traced (i.e., on which static analysis is performed) for its first argument (i.e., URL resolving). This allows the static analyzer to trace through DataQueryService.connectionManager and ConnectionManager.url (via EmulationResult::bytecode) which are otherwise unassigned when observed statically.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices.

The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method of emulating application code in a simulated environment, comprising:
- receiving an application code including an external initialization code component, the application code deployed in a cloud computing environment;
- responsive to detecting an anchor point in the application code, inserting a code hook into the application code to record external initialization actions performed by the application code;
- detecting a connection request to an external resource in the external initialization code component;
- emulating a response to the connection request, the emulating comprising injecting, within the simulated environment and without contacting the external resource, at least one of an emulated object or an emulated value in place of a response from the external resource; and
- storing the emulated response for generating a set of instructions based on the recorded external initialization actions for a static analyzer to perform static analysis on the application code and the generated set of instructions.

2. The method of claim 1, wherein the connection request is a call to connect to an external resource.

3. The method of claim 2, wherein the external resource is any one of: a database, a software library, a network service, a cloud based software service, and a software class.

4. The method of claim 1, wherein the emulated response is any one of: injecting an emulated value, and injecting an emulated object.

5. The method of claim 1, further comprising:
- emulating another response in response to detecting that the application code was not initialized.

6. A non-transitory computer readable medium having stored thereon instructions to cause a processing circuitry to execute a process to:
- receive an application code including an external initialization code component, the application code deployed in a cloud computing environment;
- responsive to detection of an anchor point in the application code, insert a code hook into the application code to record external initialization actions performed by the application code;
- detect a connection request to an external resource in the external initialization code component;
- emulate a response to the connection request, wherein to emulate the response, the process further to inject, within a simulated environment and without contacting the external resource, at least one of an emulated object or an emulated value in place of a response from the external resource; and
- store the emulated response for generating a set of instructions based on the recorded external initialization actions for a static analyzer to perform static analysis on the application code and the generated set of instructions.

7. A system for emulating application code in a simulated environment, comprising:
- a processing circuitry; and
- a memory, operatively coupled to the processing circuitry, the memory containing instructions that, when executed by the processing circuitry, cause the system to:
- receive an application code including an external initialization code component, the application code deployed in a cloud computing environment;
- responsive to detection of an anchor point in the application code, insert a code hook into the application code to record external initialization actions performed by the application code;
- detect a connection request to an external resource in the external initialization code component;
- emulate a response to the connection request, wherein to emulate the response, the system further to inject, within the simulated environment and without contacting the external resource, at least one of an emulated object or an emulated value in place of a response from the external resource; and
- store the emulated response for generating a set of instructions based on the recorded external initialization actions for a static analyzer to perform static analysis on the application code and the generated set of instructions.

8. The system of claim 7, wherein the connection request is a call to connect to an external resource.

9. The system of claim 8, wherein the external resource is any one of: a database, a software library, a network service, a cloud based software service, and a software class.

10. The system of claim 7, wherein the memory contains further instructions that when executed by the processing circuitry further configure the system to generate an emulated response which is any one of: injecting an emulated value, and injecting an emulated object.

11. The system of claim 7, wherein the memory further contains instructions that when executed by the processing circuitry further configure the system to:

emulate another response in response to detecting that the application code was not initialized.

* * * * *